Patented Jan. 23, 1945

2,367,789

UNITED STATES PATENT OFFICE 2,367,789

METHOD OF MAKING A FOOD PRODUCT FROM LEMON JUICE

Herbert T. Leo, Clarence C. Taylor, and John W. Lindsey, Anaheim, Calif., assignors to Mutual Citrus Products Company, Anaheim, Calif., a corporation of California No Drawing. Application January 19, 1942, Serial No. 427,297

5 Claims. (Cl. 99—206)

This invention relates to a food product containing soluble lemon juice solids but lacking the characteristic lemon flavor. The invention also pertains to methods of making such a food product.

In conventional methods of preparing citric acid from lemon juice, the juice is treated with lime and calcium carbonate to precipitate the acid as calcium citrate. The precipitated calcium citrate is allowed to settle; the supernatant liquor is removed; and the citrate is washed repeatedly to remove the organic matter that causes darkening of the product. The citrate is then treated in water suspension with sulfuric acid to precipitate calcium sulfate and to liberate citric acid. Precipitated calcium sulfate is removed from the resulting citric acid solution by filtration and the solution is then treated by means of decolorizing carbon to form a solution of citric acid, which is still somewhat impure. This solution, containing calcium sulfate together with the citrates of iron, copper, lead and other metals, is concentrated in vacuo to effect partial crystallization of the citric acid, which is then recovered.

The above described conventional method of preparing citric acid from lemon juice not only involves a high cost but the destruction of valuable vitamins present in lemon juice, in particular, ascorbic acid or vitamin C. Further, the neutral or slightly alkaline salts of citric acid such as potassium and magnesium citrates naturally present in lemon juice are decomposed.

Citric acid is used for many purposes, some of which require substantially pure citric acid. However, there are a great number of industries using citric acid as an ingredient of food products that also contain large amounts of fillers such as starch, sugars, glucose, gelatine, gums, pectin, and the like. In such food products the presence of vitamin C and of citric acid salts on the order of potassium citrate which function as buffers is often desirable. Food products of this type include carbonated beverages; gelatine preparations (such as "Jello-O"); medicinal compositions including sodium bicarbonate, citric acid and medicinals ("Alka-Seltzer"); jellies and jams containing sugars; and the like.

A product containing a spray-dried mixture of corn syrup and lemon juice solids has heretofore been offered to the above mentioned industries that utilize citric acid in food products where the presence of sugars and vitamins is not only unobjectionable but even desirable. Such products have been prepared by methods essentially consisting in squeezing lemons through rollers, whereby some oil from the peel is released as well as bitter juices together with the juice from the inner fruit pulp sacs. To each 70 gallons of the resulting juice there is added about 350 pounds of corn syrup. The resulting syrup tests about 33° to 36° Brix; is murky in appearance and has fruit solids, insoluble dextrines, proteins, starch hulls and emulsified lemon oil suspended therein. This syrup is spray-dried to yield a powder difficultly soluble in water, forming a solution murky with colloidal matter including suspended solids and oil, and distinguished by a distinct lemon flavor. The dextrines, insoluble fruit solids and starch hulls tend to coat the soluble ingredients with insoluble films so that the product is rendered more difficultly soluble. The keeping quality of this spray-dried powder is poor, for the proteins present eventually develop a disagreeable odor.

It is, therefore, an important object of the present invention to provide a powdery mixture of corn syrup solids and lemon juice solids retaining the natural ascorbic acid content, the citrate content and the content of other valuable ingredients of lemon juice.

Another object of this invention is to provide a stable powder of the nature indicated having good keeping qualities, especially when kept in a carbon dioxide atmosphere, easily yielding a clear water solution and free from strong lemon flavor and devoid of active bacteria and enzymes, oxidases and other undesirable constituents.

A further object of the invention is to provide methods of making such powdery mixtures of lemon juice solids and corn syrup solids.

Other and further objects and features of this invention will become apparent from the following description and the appended claims.

According to our novel process, only the juice from the inner cells of the lemons is utilized. Hence the juice is extracted by the process conventionally referred to as "reaming." No lemon oil or bitter juice is extracted from the lemons. Large fruit sacs are then removed by means of revolving stainless steel screens. After screening, the juice is heated as quickly as possible to from 190° to 212° F. for the purpose of killing bacteria and destroying oxidizing enzymes. To facilitate this operation and to prevent oxidation, especially of ascorbic acid, there is added to each 100 gallons of lemon juice, before the heating step, one ounce of sodium bisulfite. After having been brought to the specified temperature, the juice is immediately cooled to below 150° F. and about 350 pounds dextrinized glucose (about 35° to 40°

Brix) is added to each 70 gallons of juice. If, as occasionally happens, lemon juice is produced that is naturally low in citric acid content, then concentrated sterile lemon juice may be added to produce a product of standard composition. The resulting lemon juice-glucose syrup may have a Brix reading of from 30° to 50°.

The lemon juice-dextrinized glucose ratio should be kept fairly close to the specified ratio, for too low ratio of lemon juice causes a too great dilution of the lemon juice solids, while too much lemon juice causes drying difficulties.

After the sterile lemon juice and corn syrup have been thoroughly mixed, one ounce of sodium bisulfite is added to each 100 gallons of mixture to prevent oxidation during subsequent filtering operations, and the syrup is heated in a heat exchanger to between 140° and 170° F. Diatomaceous earth is then added, and the mixture is pumped through a filter press. A syrup of this character tends to change chemically upon prolonged heating and the filtered syrup is therefore cooled to below 100° F. The filtered and cooled syrup is now ready to be sprayed. A high pressure spray nozzle of conventional type may be used. The syrup should test above 30° Brix, or the resultant powder will be too light, too finely divided and fluffy for convenient handling. The final product has a moisture content of less than 1%.

In place of lemons, other citrus fruits, such as limes, may be used as a starting material.

The sulfur dioxide generated from the added sodium bisulfite prevents oxidation during the drying process, being then volatilized and removed from the syrup so that no sulfur dioxide is present in the final product, which is free from colloidal material, active bacteria, harmful enzymes, suspended starch particles, insoluble dextrine and proteins. The finished powder is easily soluble in water to a clear solution.

Small proportions of sodium bisulfite may be added to the spray-dried product as a preservative to the ascorbic acid.

The nature of the filter aid used is of particular importance in effecting complete removal of colloidal and suspended solid matter. Natural diatomaceous earth gives satisfactory results not obtainable by means of partially fused diatomaceous earth, even that fused in the presence of fluxing agents. Natural diatomaceous earth yields clear solutions in which no settling will occur for 12 months or longer.

Sterilization after filtration is not desirable, for corn syrup solids tend to darken rapidly and change otherwise on heating with lemon juice to sterilizing temperatures so that the final product then obtained will not dry satisfactorily when sprayed and will have a dark color and a disagreeable flavor.

The product of this invention is devoid of active bacteria and enzymes, so that precipitation of pectin or the like will not occur even on standing of solutions of the product for periods as long as 12 months.

The products of this invention have a valuable content of dextrinized glucose or like sugars which may be utilized in the preparation of food products. In the preparation of carbonated beverages, for instance, 11 pounds or 1 gallon of syrup testing 68° Brix may be prepared from 2 pounds of powdered lemon juice, 4 pounds of water and 5 pounds of sugar. To one part by volume of this syrup may be added one part by volume of a simple syrup to form a bottler's throwing syrup. One fluid ounce of this throwing syrup may be put into an 8 ounce bottle which is then filled with carbonated water. The resulting beverage derives its sugar content partly from the lemon juice powder, partly from the added sugar and partly from the simple syrup and contains citric acid together with ascorbic acid.

Flavored, colored, acidified and sweetened gelatine products on the order of "Jell-O" may also be prepared from the lemon juice powders of this invention. Such products may contain 3.62% citric acid, 85.0% sugar, 2.18% sodium citrate, and 9.20% gelatine together with small amounts of flavoring and coloring ingredients. Such products may be duplicated by a composition including 20% of the powdered lemon juice of this invention, 70% sugar and 9.2% gelatine but containing additionally valuable ascorbic acid.

Baking powders may also be prepared from the powdered lemon juice of the present invention. Such a baking powder may include 31% calcium acid phosphate, 27% sodium bicarbonate, 1% magnesium carbonate and 41% powdered lemon juice. In this baking powder the sugar content of the lemon juice powder is utilized as a filler similar to the starch content of conventional baking powders.

This invention thus provides a useful food product derived from lemon juice and including the citric acid, citrate and ascorbic acid content of lemon juice together with sugars such as dextrinized glucose but devoid of flavoring oils, active enzymes and living bacteria. This product may be prepared by extracting lemon juice by reaming, sterilizing the juice, adding corn syrup, and spray-drying the resulting mixture. Many details of procedure and composition may be varied within a wide range without departing from the principles of this invention and it is, therefore, not our purpose to limit the patent granted on this invention otherwise than necessitated by the scope of the appended claims.

We claim as our invention:

1. A method of preparing a food product including extracting lemon juice from the inner cells of lemons by reaming, sterilizing the lemon juice, thereafter adding sugar to the juice, filtering the resulting syrup to remove colloidal and suspended matter, and spray-drying the filtered syrup.

2. A method of preparing a food product including extracting juice from lemons by reaming, adding sodium bisulfite to the lemon juice, sterilizing the lemon juice, thereafter adding dextrinized glucose to the juice, filtering the resulting syrup with diatomaceous earth, and spray-drying the filtered syrup.

3. A method of preparing a food product including extracting juice from lemons by reaming, adding sodium bisulfite to the extracted juice as a preservative in the ascorbic acid content thereof, heating the juice to 190° to 212° F. to sterilize the juice and render enzymes inactive, cooling the juice to below 150° F., adding about 350 pounds of dextrinized glucose to each 70 gallons of juice, heating the resulting syrup to 140° to 170° F., filtering the heated syrup with diatomaceous earth, and spray-drying the filtered syrup.

4. A method of preparing a food including extracting juice from lemons by reaming, adding sodium bisulfite to the extracted juice as a preservative for the ascorbic acid content thereof, heating the juice to 190° to 212° F. to pasteurize the juice, cooling the juice immediately after pasteurization has been effected to below 150° F., adding dextrinized glucose in amounts equivalent to about 350 pounds of glucose for each 70 gallons of juice, heating the resulting syrup to 140° to 170° F., filtering the heated syrup with diatomaceous earth, cooling the filtered syrup to below 100° F., and spray-drying the syrup.

5. A method of preparing a food product including extracting juice from lemons by reaming, adding sodium bisulfite to the extracted juice as a preservative for the ascorbic acid content thereof, heating the juice to 190° to 212° F. to pasteurize the juice, cooling the juice immediately after pasteurization has been effected to below 150° F., adding dextrinized glucose in amounts equivalent to about 350 pounds of glucose for each 70 gallons of juice, heating the resulting syrup to 140° to 170° F., filtering the heated syrup with diatomaceous earth, cooling the filtered earth to below 100° F., spray-drying the syrup and incorporating sodium bisulfite with the spray-dried product.

HERBERT T. LEO.
CLARENCE C. TAYLOR.
JOHN W. LINDSEY.